(12) United States Patent
Katagiri

(10) Patent No.: US 11,487,477 B2
(45) Date of Patent: Nov. 1, 2022

(54) MEMORY SYSTEM AND METHOD OF FETCHING COMMAND

(71) Applicant: KIOXIA CORPORATION, Tokyo (JP)

(72) Inventor: Toru Katagiri, Sagamihara Kanagawa (JP)

(73) Assignee: KIOXIA CORPORATION, Tokyo (JP)

( * ) Notice: Subject to any disclaimer, the term of this patent is extended or adjusted under 35 U.S.C. 154(b) by 0 days.

(21) Appl. No.: 17/186,478

(22) Filed: Feb. 26, 2021

(65) Prior Publication Data

US 2022/0027092 A1 Jan. 27, 2022

(30) Foreign Application Priority Data

Jul. 21, 2020 (JP) .............................. JP2020-124364

(51) Int. Cl.
*G06F 12/00* (2006.01)
*G06F 3/06* (2006.01)

(52) U.S. Cl.
CPC .......... *G06F 3/0659* (2013.01); *G06F 3/0604* (2013.01); *G06F 3/067* (2013.01); *G06F 3/0613* (2013.01); *G06F 3/0653* (2013.01)

(58) Field of Classification Search
CPC .... G06F 11/008; G06F 11/22; G06F 11/3058; G06F 11/3495; G06F 17/00; G06F 11/1662; G06F 11/2094
USPC ....................................................... 711/154
See application file for complete search history.

(56) References Cited

U.S. PATENT DOCUMENTS

| | | | |
|---|---|---|---|
| 2003/0051081 A1* | 3/2003 | Maeda | G06F 3/0689 710/20 |
| 2006/0159012 A1* | 7/2006 | Yoshimoto | G06F 11/2025 370/220 |
| 2009/0122706 A1* | 5/2009 | Alfano | H04L 41/046 370/252 |
| 2016/0055096 A1 | 2/2016 | Chirca et al. | |
| 2016/0117119 A1* | 4/2016 | Kim | G06F 13/1642 711/103 |
| 2016/0350114 A1* | 12/2016 | Airaud | G06F 9/3838 |
| 2017/0346762 A1* | 11/2017 | Lapidous | H04L 45/245 |
| 2018/0173433 A1* | 6/2018 | Miller | G06F 3/0611 |
| 2018/0189202 A1 | 7/2018 | Yap et al. | |
| 2019/0278523 A1* | 9/2019 | Benisty | G06F 3/0659 |
| 2019/0339905 A1* | 11/2019 | Mizuno | G06F 3/0659 |
| 2020/0089404 A1* | 3/2020 | Richter | G06F 3/0659 |
| 2021/0326250 A1* | 10/2021 | Bennett | G06F 3/0659 |
| 2022/0027092 A1* | 1/2022 | Katagiri | G06F 3/0613 |
| 2022/0035564 A1* | 2/2022 | Vikram Singh | G06F 3/0679 |

* cited by examiner

Primary Examiner — Mohamed M Gebril
(74) Attorney, Agent, or Firm — Kim & Stewart LLP

(57) ABSTRACT

A memory system includes a non-volatile memory and a controller. The controller controls writing of data to the non-volatile memory or reading of data from the non-volatile memory, in response to a command from at least one host. The controller performs command fetching by calculating for each of a plurality of queues, a remaining processing amount, which is an amount of processing remaining for one or more commands previously fetched therefrom, selecting a queue based on the remaining processing amounts calculated for the plurality of queues, and fetching a new command from the selected queue.

14 Claims, 12 Drawing Sheets

*FIG. 6*

| HOST | QUEUE | REMAINING PROCESSING AMOUNT (REMAINING COST) |
|---|---|---|
| HOST [1] | QUEUE [1] | $C_{11}$ |
| HOST [1] | QUEUE [2] | $C_{12}$ |
| HOST [1] | QUEUE [3] | $C_{13}$ |
| HOST [1] | QUEUE [4] | $C_{14}$ |
| HOST [2] | QUEUE [1] | $C_{21}$ |
| HOST [2] | QUEUE [2] | $C_{22}$ |
| HOST [2] | QUEUE [3] | $C_{23}$ |
| HOST [2] | QUEUE [4] | $C_{24}$ | c1, c2, c3

MEMORY SYSTEM AND METHOD OF FETCHING COMMAND

CROSS-REFERENCE TO RELATED APPLICATION(S)

This application is based upon and claims the benefit of priority from Japanese Patent Application No. 2020-124364, filed on Jul. 21, 2020, the entire contents of which are incorporated herein by reference.

FIELD

Embodiments described herein relate generally to a memory system and a method of fetching a command.

BACKGROUND

A memory system that is connected to multiple hosts may use an arbitration method to fetch commands from the multiple hosts and multiple queues in a balanced manner. As a result, the number of commands to be fetched is uniform among hosts and queues.

DESCRIPTION OF THE DRAWINGS

FIG. 6 is a diagram illustrating an example of a remaining processing table used in the memory system of the embodiment.

FIG. 13 is a flowchart illustrating a procedure in which the memory system of the embodiment selects a queue to fetch a command from.

DETAILED DESCRIPTION

With an arbitration method that selects hosts and queues based only on the number of commands per selection, if the types of commands and the amounts of target data for those commands are not taken into consideration, the resulting amounts of processing for the fetched commands may vary among a plurality of hosts and a plurality of queues.

Embodiments provide a memory system and a method of fetching commands capable of reducing variations in the amount of processing completed over time for each of a plurality of hosts and for each of a plurality of queues.

In general, according to one embodiment, the memory system includes a non-volatile memory and a controller. The controller controls writing of data to the non-volatile memory or reading of data from the non-volatile memory, in response to a command from at least one host. The controller performs command fetching by calculating for each of a plurality of queues, a remaining processing amount, which is an amount of processing remaining for one or more commands previously fetched therefrom, selecting a queue based on the remaining processing amounts calculated for the plurality of queues, and fetching a new command from the selected queue.

Hereinafter, embodiments will be described with reference to the accompanying drawings.

Figure 1:
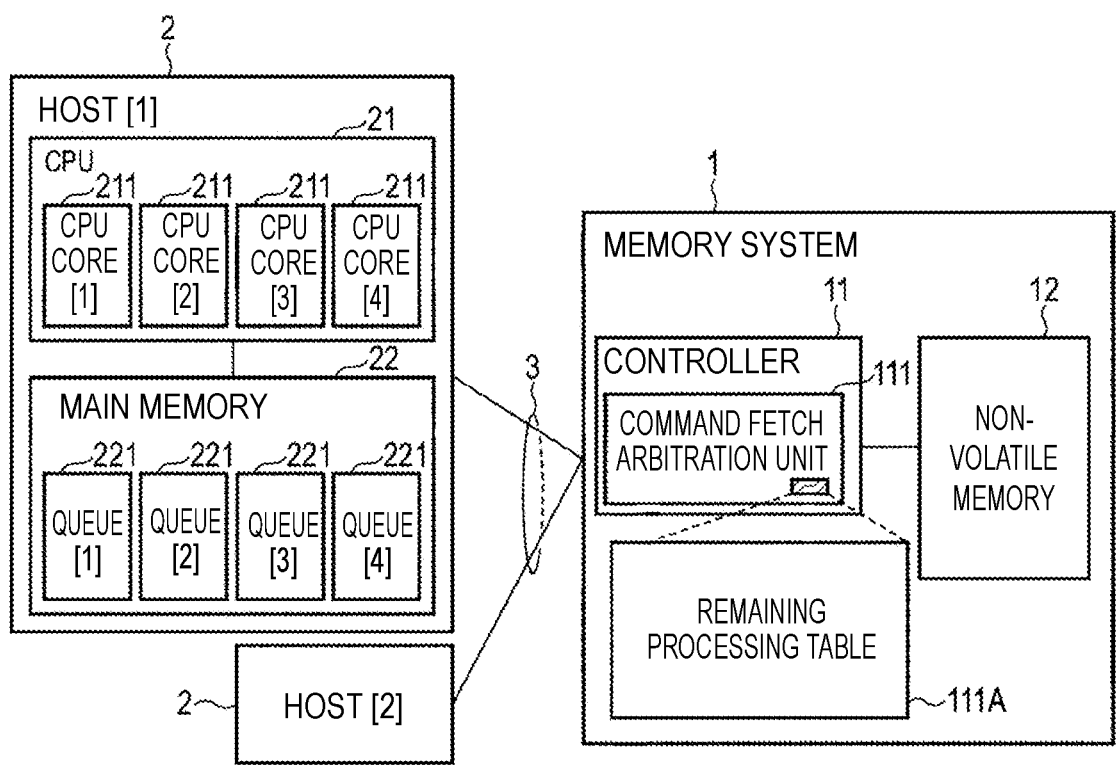
FIG. 1 is a diagram illustrating a configuration example of an information processing system including a memory system of an embodiment and a host connected to the memory system.

FIG. 1 is a diagram illustrating a configuration example of a memory system 1 of the present embodiment. FIG. 1 also illustrates a configuration example of an information processing system that includes the memory system 1, hosts 2 connected to the memory system 1, and an interface 3 connecting the memory system 1 and the hosts 2.

The memory system 1 may be implemented as a storage device such as a solid state drive (SSD). Here, an example in which the memory system 1 is implemented as an SSD is illustrated. The memory system 1 may be connected to one or more hosts 2 via the interface 3. The memory system 1 communicates with the hosts 2 using, for example, the Non-Volatile Memory (NVM) Express (NVMe®) protocol. FIG. 1 illustrates an example in which the memory system 1 is connected to two hosts 2: host [1] and host [2]. The hosts 2 are information processing devices such as personal computers or servers.

The memory system 1 includes a controller 11 and a non-volatile memory 12. The controller 11 is configured as, for example, a system-on-a-chip (SoC). The non-volatile memory 12 is, for example, a NAND type flash memory.

The controller 11 executes a process of writing data transmitted from the hosts 2 to the non-volatile memory 12 and a process of reading data requested by the hosts 2 from the non-volatile memory 12 based on commands issued by the hosts 2. That is, the controller 11 controls the non-volatile memory 12 based on commands issued by the hosts 2.

Each host 2 includes a CPU 21 and a main memory 22. The CPU 21 includes one or more CPU cores 211. FIG. 1 illustrates an example in which the CPU 21 includes four CPU cores 211: CPU cores [1] to [4]. Each host 2 may include a different number of CPU cores 211. Commands for the memory system 1 are issued from each CPU core 211. In FIG. 1, the main memory 22 is provided with the same number of queues 221 as the number of CPU cores 211. The main memory 22 thus includes four queues 221: queues [1] to [4]. The number of queues 221 may be different from the number of CPU cores 211. For example, a single queue 221 may be provided for a plurality of CPU cores 211. A command issued from a CPU core 211 is stored in a queue 221. Each CPU core 211 stores commands for the memory system 1 in a queue 221 corresponding to each CPU core 211.

Figure 2:
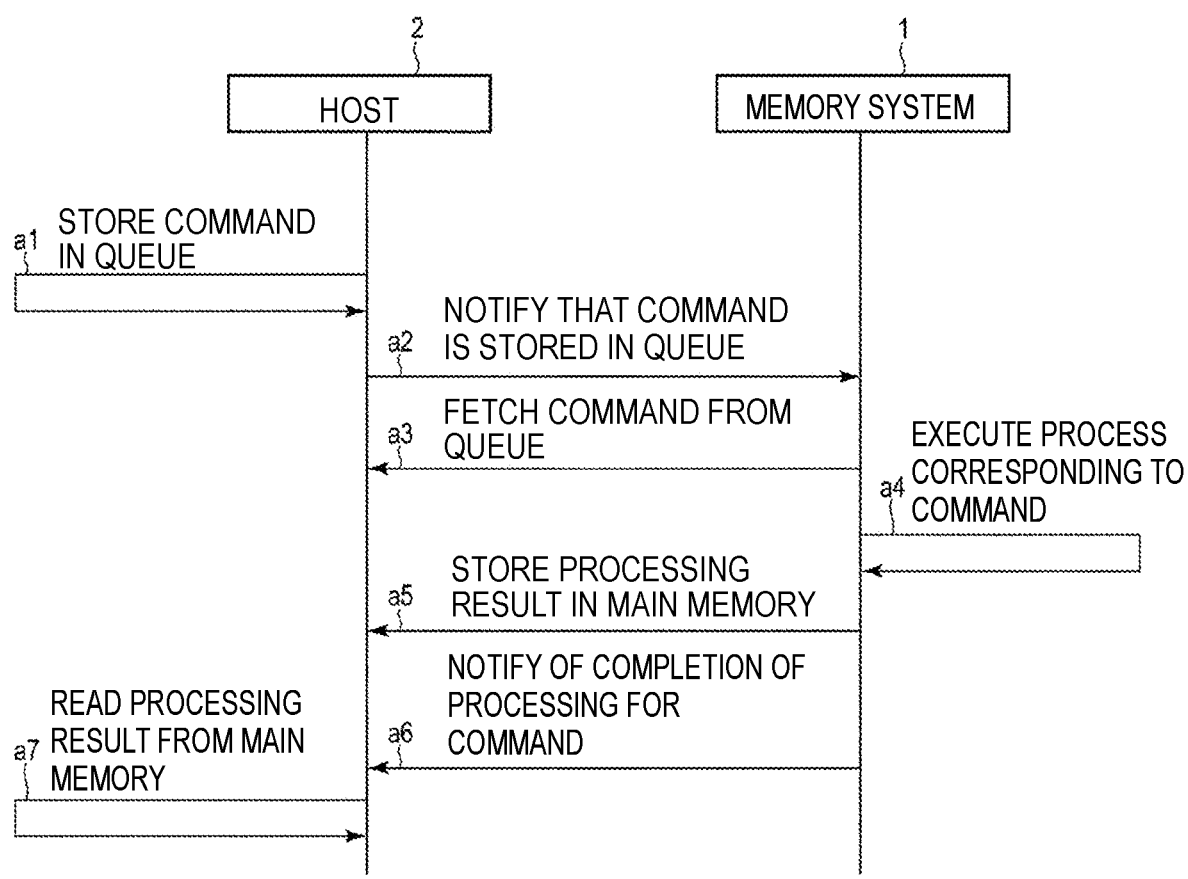
FIG. 2 is a diagram illustrating an example of a communication flow between the memory system of the embodiment and the host during command fetching.

The controller 11 of the memory system 1 fetches commands from queues 221 of each host 2 and executes processes corresponding to the commands. With reference to FIG. 2, an example of communication flow between the memory system 1 and a host 2 involving fetching commands from a queue 221 will be described.

As described above, a CPU core 211 of a host 2 stores a command for the memory system 1 in a queue 221 (a1). When the command is stored in the queue 221, the CPU core 211 notifies the memory system 1 that the command is stored in the queue 221 (a2). The controller 11 of the memory system 1 recognizes that the command is stored in the queue 221 by this notification. The controller 11 arbitrates command fetching between the queue 221 of the host 2 and a queue 221 of another host 2 and eventually fetches the command from the queue 221 corresponding to the notification (a3).

The controller 11 executes a process corresponding to the fetched command (a4). The controller 11 stores the processing result in the main memory 22 of the host 2 (a5). In the main memory 22, for example, a queue in which the controller stores the processing result, known as a completion queue, is provided one-to-one with each queue 221. When the processing result is stored in the main memory 22, the controller 11 notifies the host 2 of the completion of the processing for the command (a6). In response to this notification, the CPU core 211 of the host 2 reads the processing result from the main memory 22 and recognizes the completion of the processing for the command (a7).

Here, a command fetch arbitration in a memory system of a comparative example will be described with reference to FIG. 3. Further, here, it is assumed that there is no high or low priority regarding command execution among the plurality of hosts 2.

In the memory system of the comparative example, the hosts 2 are sequentially selected in a round-robin (RR) arbitration method so that the number of commands to be fetched is uniform among the plurality of hosts 2 (b1). Next, the memory system of the comparative example selects a queue in each host 2 by additional round-robin arbitration methods so that the number of commands to be fetched is uniform among the plurality of queues in each host 2 (b2, b3). Then, the memory system of the comparative example fetches a predetermined number of commands from each queue selected in this way.

Figure 3:
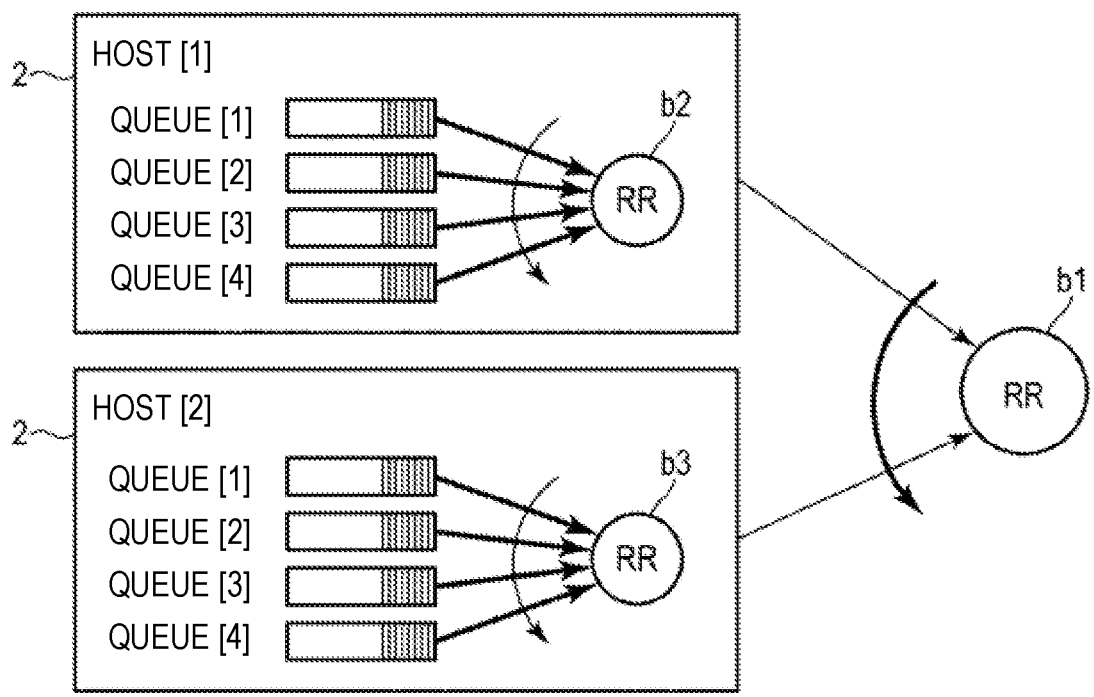
FIG. 3 is a diagram illustrating a command fetch arbitration by a memory system of a comparative example.

In FIG. 3, it is assumed that two hosts 2 (host [1], host [2]) are connected to the memory system of the comparative example, and each host 2 includes four queues (queue [1] to queue [4]). When fetching two commands from each queue as the predetermined number of commands, the memory system of the comparative example may fetch the commands, for example, in the following order:

(1) Fetch two commands from the queue [1] of the host [1]

(2) Fetch two commands from the queue [1] of the host [2]

(3) Fetch two commands from the queue [2] of the host [1]

(4) Fetch two commands from the queue [2] of the host [2]

(5) Fetch two commands from the queue [3] of the host [1]

(6) Fetch two commands from the queue [3] of the host [2]

(7) Fetch two commands from the queue [4] of the host [1]

(8) Fetch two commands from the queue [4] of the host [2]

Further, even if the number of queues is different between the host [1] and the host [2], due to the round-robin arbitration method indicated by the reference numeral b1, the number of commands to be fetched is uniform between the host [1] and the host [2]. In the host [1], the number of commands to be fetched becomes uniform among the queues due to the round-robin arbitration method indicated by the reference numeral b2. In the host [2], the number of commands to be fetched becomes uniform among the queues due to the round-robin arbitration method indicated by the reference numeral b3.

Next, the problem of the command fetch arbitration by the memory system of the comparative example will be described.

Figure 4A:
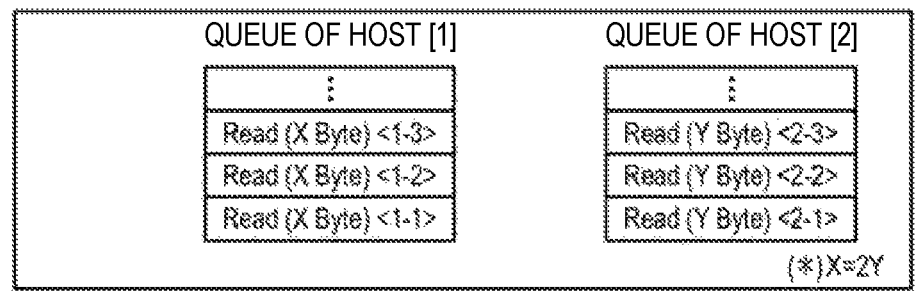
FIGS. 4A to 4C are diagrams illustrating a first example of a problem that may occur in the command fetch arbitration used in the comparative example illustrated in FIG. 3.
Figure 4B:
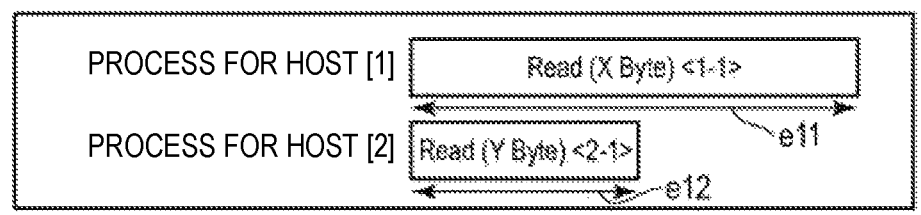
Figure 4C:
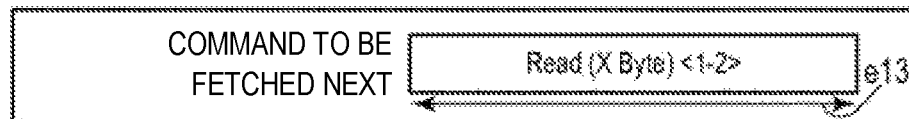

FIGS. 4A to 4C are diagrams illustrating a first example of a problem that may occur in the command fetch arbitration method used in the memory system of the comparative example. In FIGS. 4A to 4C, for convenience of explanation, the four queues of each host illustrated in FIG. 3 are integrated into one queue.

FIG. 4A illustrates an example of storage of commands in the queues of each host 2. Here, it is assumed that read commands <1-1>, <1-2>, <1-3>, . . . that each request reading of X-byte data are stored in the queue of the host [1], and read commands <2-1>, <2-2>, <2-3>, . . . that each request reading of Y-byte data, which is half the size of X-byte data, are stored in the queue of the host [2].

FIG. 4B illustrates an example of the command processing amount that is required for each host 2 when the situation illustrated in FIG. 4A is assumed. Here, for the sake of clarity, it is assumed that the memory system of the comparative example fetches one command from the queue per fetch.

The memory system of the comparative example fetches commands one-by-one alternately from the queue of the host [1] and the queue of the host [2]. The memory system of the comparative example fetches the read command <1-1> from the queue of the host [1], and then fetches the read command <2-1> from the queue of the host [2].

Here, it is assumed that the processing amount required for a command is proportional to the amount of target data for the command. The read command <1-1> fetched from the queue of the host [1] and the read command <2-1> fetched from the queue of the host [2] are both commands of the same type, i.e., read commands. The ratio of the amount of data (X bytes) targeted by the read command <1-1> to the amount of data (Y bytes) targeted by the read command <2-1> is 2:1. Therefore, the ratio of the processing amount required for the read command <1-1> to the processing amount required for the read command <2-1> is 2:1. That is, the amount of processing required by the host [1] is larger than the amount of processing required by the host [2]. In FIG. 4B, the width of the rectangle representing the read command <1-1>, which is indicated by the double-headed arrow e11, corresponds to the processing amount required for the read command <1-1>. The width of the rectangle representing the read command <2-1>, which is indicated by the double-headed arrow e12, corresponds to the processing amount required for the read command <2-1>.

The command fetch arbitration method of the memory system of the comparative example is based on the number of commands per fetch. Even when the amount of processing required by the host [1] is larger than the amount of processing required by the host [2], as illustrated in FIG. 4C, the memory system of the comparative example then fetches the read command <1-2> from the queue of the host [1]. The width of the rectangle representing the read command <1-2>, which is indicated by the double-headed arrow e13, corresponds to the processing amount required for the read command <1-2>. As previously stated, the memory system of the comparative example fetches commands one-by-one alternately from the queue of the host [1] and the queue of the host [2]. As a result, in the memory system of the comparative example, the variation in the amount of processing completed over time for each host 2 will continually increase. Such variation may occur, not only among a plurality of hosts 2, but also among a plurality of queues within a host 2.

Figure 5A:
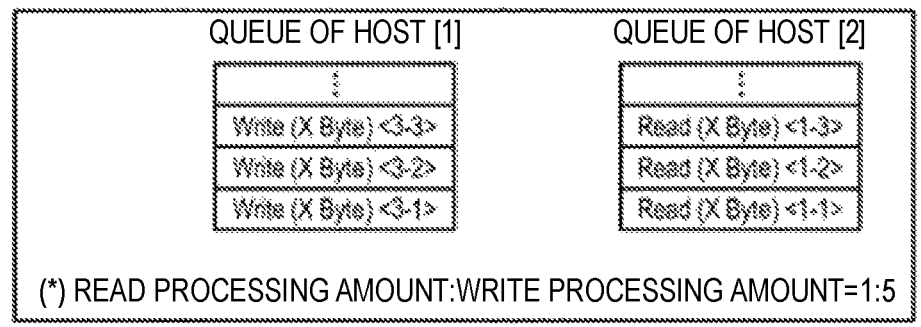
FIGS. 5A to 5C are diagrams illustrating a second example of a problem that may occur in the command fetch arbitration illustrated used in the comparative example in FIG. 3.
Figure 5B:
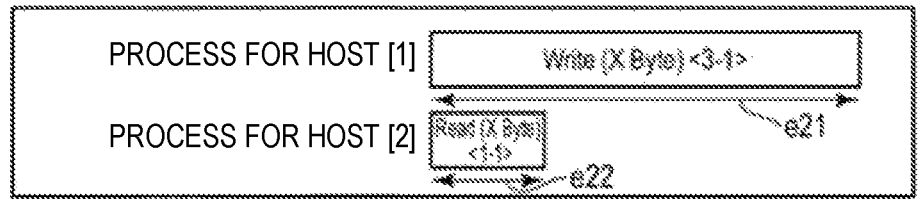
Figure 5C:

FIGS. 5A to 5C are diagrams illustrating a second example of a problem that may occur in the command fetch arbitration method used in the memory system of the comparative example. As illustrated in FIG. 5A, in the second example, it is assumed that write commands <3-1>, <3-2>, <3-3>, ... that each request writing of X-byte data are stored in the queue of the host [1], and read commands <1-1>, <1-2>, <1-3>, ... that each request reading of X-byte data are stored in the queue of the host [2].

Here, it is assumed that when the sizes of the target data for read and write commands are equal, the ratio of the processing amount required for the read command to the processing amount required for the write command is 1:5. In addition, it is here assumed that there is no high or low priority between command types.

The memory system of the comparative example fetches the write command <3-1> from the queue of the host [1], and then fetches the read command <1-1> from the queue of the host [2]. Here, since it is assumed that the amount of data targeted by each command is the same, the ratio of the processing amount required for the write command <3-1> to the processing amount required for the read command <1-1> is 5:1. That is, as illustrated in FIG. 5B, the amount of processing required by the host [1] is larger than the amount of processing required by the host [2]. The width of the rectangle representing the write command <3-1>, which is indicated by the double-headed arrow e21, corresponds to the processing amount required for the write command <3-1>. The width of the rectangle representing the read command <1-1>, which is indicated by the double-headed arrow e22, corresponds to the processing amount required for the read command <1-1>.

The command fetch arbitration method used in the memory system of the comparative example is based only on the number of commands per fetch. Even when the amount of processing required by the host [1] is larger than the amount of processing required by the host [2], as illustrated in FIG. 5C, the memory system of the comparative example then fetches the write command <3-2> from the queue of the host [1]. The width of the rectangle representing the write command <3-2>, which is indicated by the double-headed arrow e23, corresponds to the processing amount required for the write command <3-2>. As previously stated, the memory system of the comparative example fetches commands one-by-one alternately from the queue of the host [1] and the queue of the host [2]. As a result, in the memory system of the comparative example, the variation in the amount of processing completed over time for each host 2 will continually increase. Such variation may occur not only among a plurality of hosts 2 but also among a plurality of queues within one host 2.

As illustrated in FIG. 1, the controller 11 of the memory system 1 of the present embodiment includes a command fetch arbitration unit 111. The command fetch arbitration unit 111 selects a queue 221 to fetch a command from in a unique way in order to reduce the variation in the command processing amount completed over time for each host 2 and for each queue 221 of each of the plurality of hosts 2. More specifically, the command fetch arbitration unit 111 selects a host 2 and a queue 221 and fetches commands from the selected queue 221 of the selected host 2 so that the amount of processing in the memory system 1 is uniform among the plurality of hosts 2 and among the plurality of queues 221 in each host 2. Hereinafter, each command processing amount is also referred to as a cost. A command processing amount is, for example, the time required to process a command.

As illustrated in FIG. 1, the command fetch arbitration unit 111 includes a remaining processing table 111A. The remaining processing table 111A is a table to manage the amount of processing remaining for commands fetched from each queue 221 of each host 2. The remaining processing table 111A is stored in, for example, an internal memory (not illustrated) of the controller 11.

FIG. 6 illustrates an example of the remaining processing table 111A. The remaining processing table 111A includes one record, also referred to as an entry, for each queue 221 of each host 2. The remaining processing table 111A includes a host field c1, a queue field c2, and a remaining processing amount (remaining cost) field c3.

Identification information of each host 2 is stored in the host field c1. Identification information of each queue 221 is stored in the queue field c2. The identification information of each queue 221 may be any information that may uniquely specify a queue 221 within a host 2. That is, the same identification information may be used for two or more queues 221 if those two or more queues 221 are each contained by a different host 2. The amount of processing required for the commands fetched from a queue 221 specified by identification information of the host field c1 and identification information of the queue field c2 is stored in the remaining processing amount field c3. Hereinafter, the remaining processing amount is also referred to as a remaining cost.

Here, an example of a rule for increasing or decreasing the remaining cost stored in the remaining processing amount field c3 will be described. Hereinafter, the target data for a read command is referred to as read data, and the data designated to be written by a write command is referred to as write data.

First, a cost increase will be described.

When a read command or a write command is fetched from a certain queue 221 of a certain host 2, the command fetch arbitration unit 111 adds a value calculated by the following equations to the remaining cost stored in the remaining processing amount field c3 of the record corresponding to the selected queue 221 of the remaining processing table 111A.

For a read command, the value to increase the current remaining cost by is calculated by Equation 1:

Addition value=The number of clusters of read data×first coefficient (cost_tR)  (Equation 1)

Here, a cluster is a management unit of logical addresses associated with the data stored in the non-volatile memory 12, which is managed by the controller 11. Each host 2 uses logical addresses to locate data stored in the non-volatile memory 12. The controller 11 maps the logical addresses designated by the hosts 2 to physical addresses, each physical address indicating a storage location of a cluster in the non-volatile memory 12. The area represented by the logical addresses is also referred to as a logical address space. The area represented by the physical addresses is also referred to as a physical address space. The size of each cluster is, for example, 4 Kbytes.

The first coefficient (cost_tR) is a coefficient that may equal the time required to read one cluster of data from the non-volatile memory 12.

Even when a command fetched from one queue 221 and a command fetched from another queue 221 are both read commands, when the amounts of read data (e.g., the numbers of clusters) are different, the addition values corresponding to the respective queues are different from each other.

For a write command, the value to increase the current remaining cost by is calculated by Equation 2:

Addition value=The number of clusters of write data×second coefficient (cost_tProg)  (Equation 2)

Here, the second coefficient (cost_tProg) is a coefficient that may equal the time required to write one cluster of data to the non-volatile memory 12.

In other words, even when a command fetched from one queue and a command fetched from another queue are both write commands, when the amounts of write data (e.g., the numbers of clusters) are different, the addition values corresponding to the respective queues are different from each other. Further, even when the amount of read data of a read command fetched from one queue and the amount of write data of a write command fetched from another queue are the same, due to the differences in the coefficients cost_tR and cost_tProg included in Equation 1 and Equation 2, the addition values corresponding to the respective queues are different from each other. The ratio of the first coefficient (cost_tR) to the second coefficient (cost_tProg) is, for example, 1:5. This means that the cost per cluster of write commands is five times the cost per cluster of read commands.

Further, a write command designates a logical address that indicates a point in the logical address space to begin writing target data. Sometimes, the designated logical address does not correspond to a boundary between clusters. Additionally, the logical address at which writing of the target data is completed may also not correspond to a boundary between clusters. When calculating the addition value for such a write command, the command fetch arbitration unit 111 further adds values for the first coefficient (cost_tR). This addition will now be described with reference to FIGS. 7A and 7B.

Figure 7A:
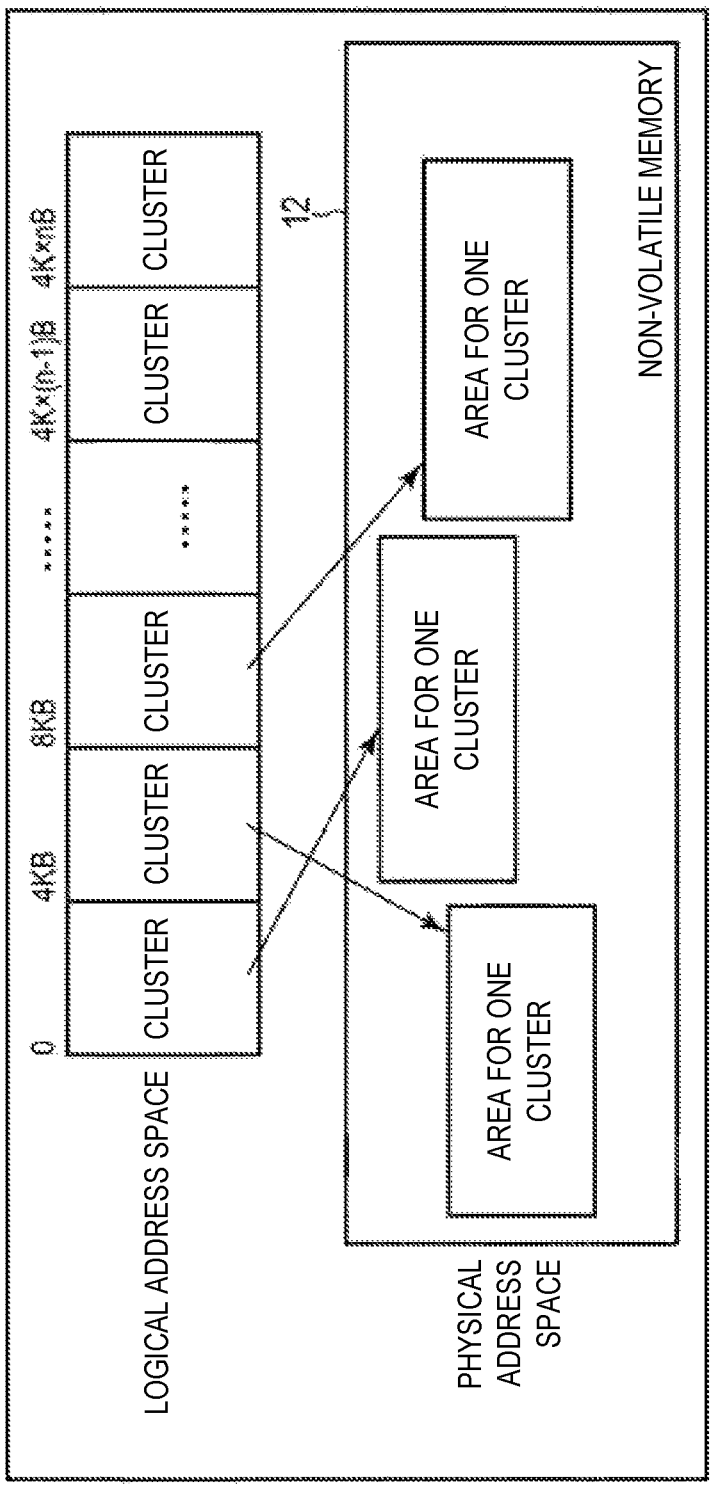
FIGS. 7A and 7B are diagrams illustrating an example of processing corresponding to a write command in which a logical address of data to be written does not correspond to a boundary of a cluster according to the embodiment.

FIG. 7A illustrates a correspondence between a logical address and a physical address. When a read command is received, the controller 11 maps the logical address designated by the host 2 into a physical address and executes reading of data from the non-volatile memory 12. Meanwhile, when a write command is received, the controller 11 writes data to the non-volatile memory 12, and associates the physical address of the write destination with a logical address designated by the host 2.

Figure 7B:
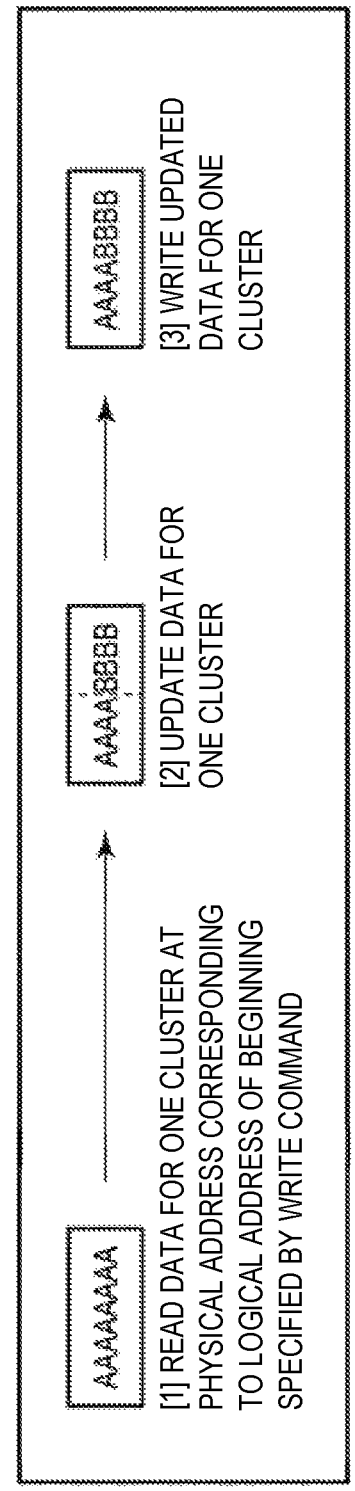

FIG. 7B represents an example of processing by the controller 11 when the designated logical address indicating a point in the logical address space to begin writing data at does not correspond to the boundary of a cluster.

When the designated logical address does not correspond to the boundary of a cluster, the controller 11 needs to partially update data of the cluster stored at the physical address corresponding to the designated logical address. In other words, a part of the data previously written to the cluster needs to remain. Therefore, the controller 11 first reads the data of the cluster (see part [1] of FIG. 7B). The controller 11 updates the data by replacing a part of the data with a part of the write data (see part [2] of FIG. 7B). The controller 11 writes the updated data to the non-volatile memory 12 where the original data was read from (see part [3] of FIG. 7B), and updates the correspondence between the logical address and the physical address. In FIG. 7B, "AAAAAAAA" indicates the data of the cluster before the update, and "AAAA" in the first half thereof is the data to remain. Further, "BBBB" in the second half of "AAAABBBB" after the update is a first part of the write data. The processes of parts [1] to [3] of FIG. 7B are also referred to as "Read-Modify-Write".

As described above, when a logical address indicating the beginning of the write data of a write command does not correspond to the boundary of a cluster, it is necessary to read the data for one cluster. Accordingly, when calculating the addition value for such a write command, the controller 11 adds the value for the first coefficient (cost_tR) to the addition value calculated by Equation 2. Additionally, a logical address computed by adding the size of one cluster to the designated logical address indicates the end point in the logical address space for the writing of the write data. If the calculated end point does not correspond to the boundary of a cluster, it is necessary to read the data for another cluster. For example, the controller 11 needs to read data in order to update "AAAAAAAA" to "BBBBAAAA". Accordingly, when calculating the addition value for the write command, the controller 11 again adds the value for the first coefficient (cost_tR) to the addition value calculated by Equation 2. When a logical address indicating the beginning point for the write data does not correspond to a cluster boundary and a logical address indicating the end point for the write data does not correspond to a cluster boundary, the controller 11 thus adds the value of the first coefficient (cost_tR) twice to the addition value calculated by Equation 2.

Next, a cost decrease will be described.

With respect to a read command fetched from a certain queue 221 of a certain host 2, after the read data of one cluster is transmitted to the host 2, the command fetch arbitration unit 111 subtracts the value for the first coefficient (cost_tR) from the remaining cost stored in the remaining processing amount field c3 of the record corresponding to the certain queue 221 in the remaining processing table 111A.

Further, with respect to a write command fetched from a certain queue 221 of a certain host 2, after the write data of one cluster of the write command is written to the non-volatile memory 12, the command fetch arbitration unit 111 subtracts the value for the second coefficient (cost_tProg) from the remaining cost stored in the remaining processing amount field c3 of the record corresponding to the certain queue 221 in the remaining processing table 111A.

Further, when a logical address indicating the beginning point for the write data of a write command or a logical address indicating the end point for the write data of the write command does not correspond to the boundary of a cluster, after the reading of the data of one cluster described above is completed, the command fetch arbitration unit 111 subtracts the value for the first coefficient (cost_tR) from the remaining cost stored in the remaining processing amount field c3 of the record corresponding to the certain queue 221 in the remaining processing table 111A.

Figure 8:
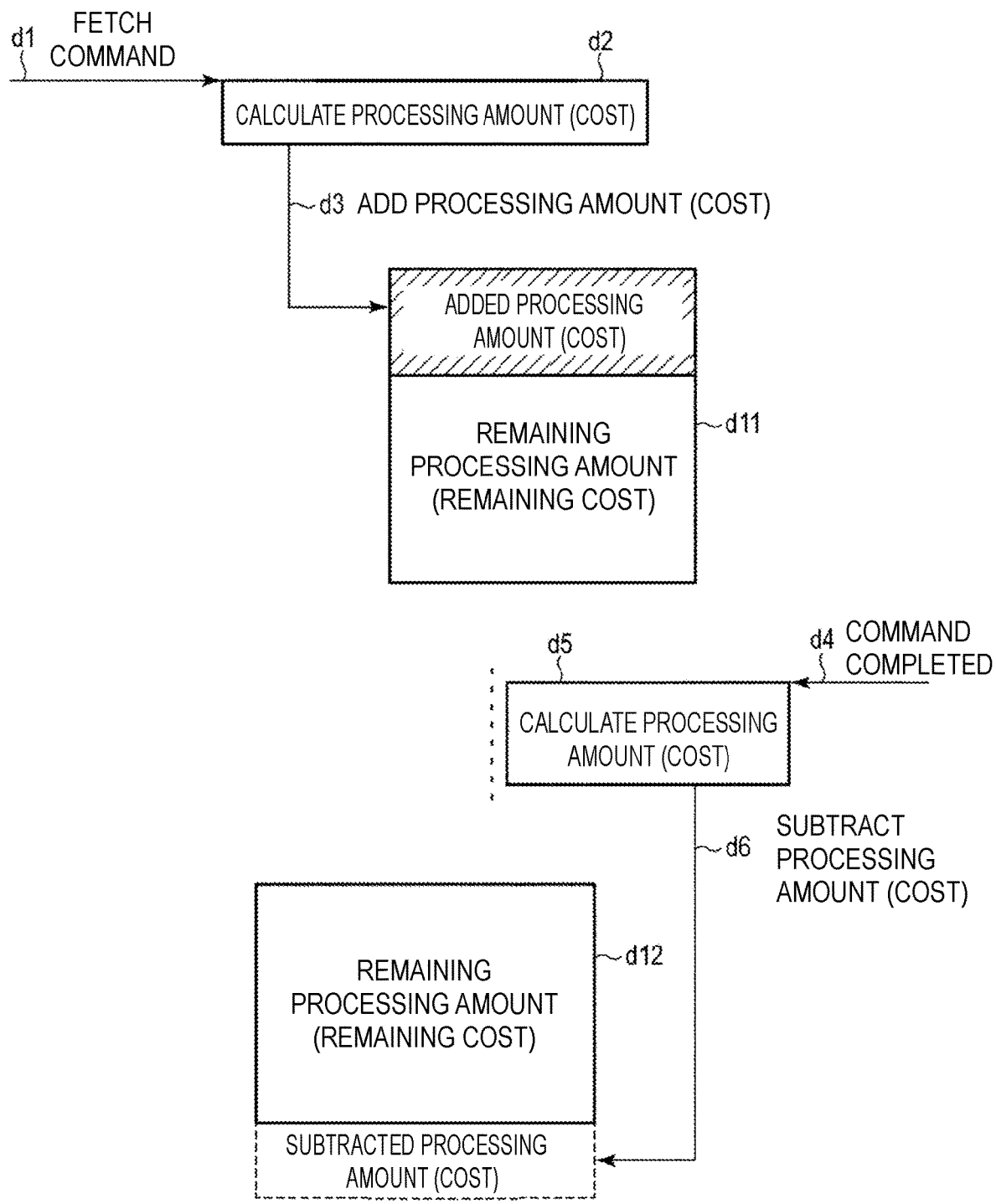
FIG. 8 is a flow diagram illustrating addition and subtraction of processing amounts to and from remaining processing amounts in the memory system of the embodiment.

FIG. 8 is a flow diagram illustrating the command fetch arbitration unit 111 adding and subtracting costs to and from the remaining processing amounts for each queue 221 of each host 2.

When a command is fetched from a certain queue 221 of a certain host 2 (d1), the command fetch arbitration unit 111 calculates the processing amount (cost) for the command (d2). The command fetch arbitration unit 111 adds the calculated cost to the remaining processing amount of the certain queue 221 (d3). The reference numeral d11 in FIG. 8 indicates the remaining processing amount for the certain queue 221 to which the cost for the fetched command is added.

When the command fetched from the certain queue 221 is completed (d4), the command fetch arbitration unit 111 calculates the cost to be subtracted from the remaining cost of the certain queue 221 (d5). Note that the completion of the command indicated by the reference numeral d4 does not need to be the completion of the entire processing for the command. The completion of the command indicated by the reference numeral d4 may be a completion of processing for one cluster of a command when the target data for the command exceeds one cluster in size. The processing for one cluster may be, for example, transmission of read data of one cluster to the host 2 or writing of write data of one cluster to the non-volatile memory 12. The command fetch arbitration unit 111 subtracts the calculated cost from the remaining cost of the certain queue 221 (d6). The reference numeral d12 in FIG. 8 indicates the remaining cost of the certain queue 221 from which the cost for the completed command is subtracted.

Under the control of the command fetch arbitration unit 111, the remaining processing amount (remaining cost) for the command fetched from each queue 221 of each host 2 is stored in the remaining processing amount field c3 of the remaining processing table 111A.

The command fetch arbitration unit 111 determines which queue 221 of which host 2 to fetch a command from based on the remaining costs stored in the remaining processing amount fields c3 of the remaining processing table 111A. More specifically, the command fetch arbitration unit 111 first selects the host 2 having the lowest remaining cost. More specifically yet, the command fetch arbitration unit 111 selects the host 2 having the lowest total remaining cost stored in the remaining processing amount fields c3. Next, the command fetch arbitration unit 111 selects the queue 221 having the lowest remaining cost from the queues 221 of the selected host 2. Then, the command fetch arbitration unit 111 fetches the command from the selected queue 221. When two or more hosts 2 have the same remaining cost or when two or more queues 221 have the same remaining cost, including in a case where the remaining cost is zero, the arbitration unit 111 may select a host 2 and/or a queue 221 by using the round-robin method.

As described above, in the memory system 1 of the present embodiment, a command fetch arbitration is performed based on costs calculated from command types and amounts of data targeted by commands, not based only on the numbers of commands. As a result, the memory system 1 of the present embodiment reduces, for the plurality of hosts 2 and the plurality of queues 221, the variation in the command processing amounts completed over time for each host 2 and each queue 221 at the time of fetching a command.

Figure 9A:
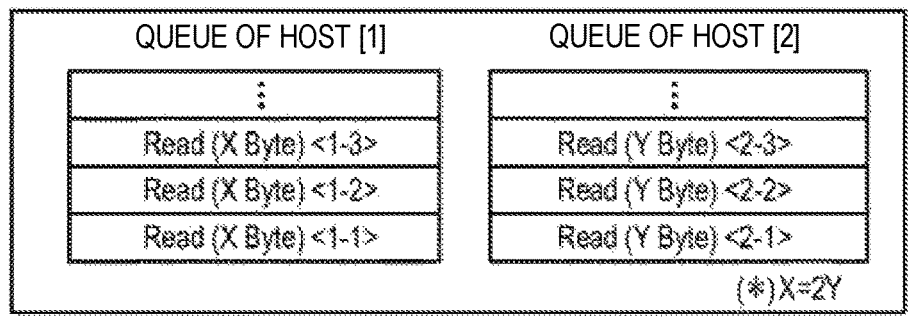
FIGS. 9A to 9C are diagrams illustrating a first example of a command fetch arbitration by the memory system of the embodiment.
Figure 9B:
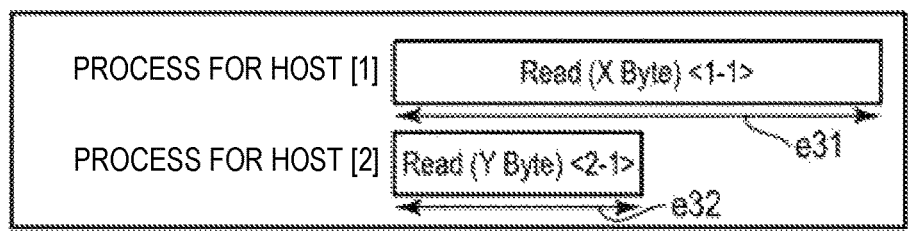
Figure 9C:

FIGS. 9A to 9C are diagrams illustrating a first example of command fetch arbitration by the memory system 1 of the present embodiment. In FIGS. 9A to 9C, for convenience of explanation, the four queues 221 of each host 2 illustrated in FIG. 1 are integrated into one queue.

FIG. 9A illustrates an example of storage of commands in the queues 221 of each host 2. Here, it is assumed that read commands <1-1>, <1-2>, <1-3>, . . . that each request reading of X-byte data are stored in the queue 221 of the host [1], and read commands <2-1>, <2-2>, <2-3>, . . . that each request reading of Y-byte data, which is half the size of X-byte data, are stored in the queue 221 of the host [2].

FIG. 9B illustrates an example of the command processing amount that is required for each host 2 when the situation illustrated in FIG. 9A is assumed. Specifically, an example is illustrated in which the read command <1-1> is fetched from the queue 221 of the host [1], and then the read command <2-1> is fetched from the queue 221 of the host [2]. Here again, it is assumed that the amount of processing required for a command is proportional to the amount of target data for the command. The read command <1-1> fetched from the queue of the host [1] and the read command <2-1> fetched from the queue of the host [2] are both commands of the same type, i.e., read commands. Further, the ratio of the amount of data (X bytes) targeted by the read command <1-1> to the amount of data (Y bytes) targeted by the read command <2-1> is 2:1. Therefore, the ratio of the processing amount for the read command <1-1> to the processing amount for the read command <2-1> is 2:1. That is, the amount of processing required by the host [1] is larger than the amount of processing required by the host [2]. In FIG. 9B, the width of the rectangle representing the read command <1-1>, which is indicated by the double-headed arrow e31, corresponds to the processing amount required for the read command <1-1>. The width of the rectangle representing the read command <2-1>, which is indicated by the double-headed arrow e32, corresponds to the processing amount required for the read command <2-1>.

The command fetch arbitration method used in the memory system 1 of the present embodiment is based on the remaining cost. When the remaining amount of processing for the host [2] is smaller than the remaining amount of processing for the host [1], as illustrated in FIG. 9C, the memory system 1 of the present embodiment then fetches the read command <2-2> from the queue 221 for the host [2]. The width of the rectangle representing the read command <2-2>, which is indicated by the double-headed arrow e33, corresponds to the processing amount required for the read command <2-2>. As a result, the memory system 1 of the present embodiment may reduce the variation in the amount of processing completed over time for each host 2 among the plurality of hosts 2.

Figure 10A:
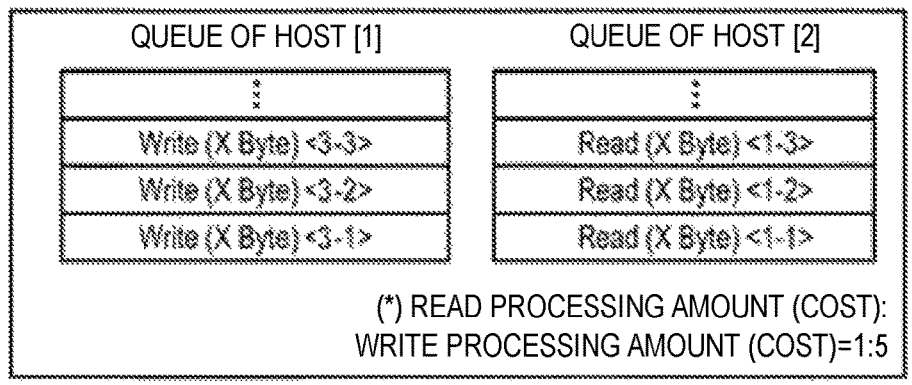
FIGS. 10A to 10C are diagrams illustrating a second example of the command fetch arbitration by the memory system of the embodiment.
Figure 10B:
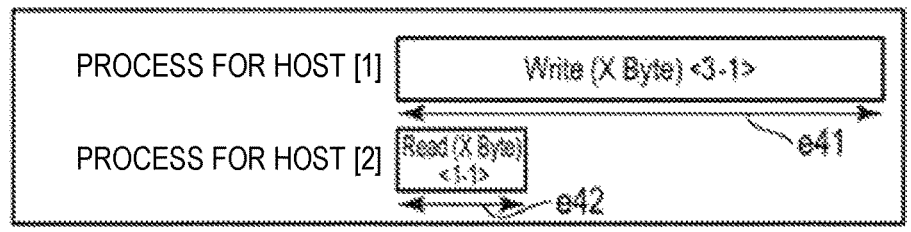
Figure 10C:

FIGS. 10A to 10C are diagrams illustrating a second example of the command fetch arbitration method used in the memory system 1 of the present embodiment. As illustrated in FIG. 10A, in the second example, it is assumed that write commands <3-1>, <3-2>, <3-3>, . . . that each request writing of X-byte data are stored in the queue 221 of the host [1], and read commands <1-1>, <1-2>, <1-3>, . . . that each request reading of X-byte data are stored in the queue 221 of the host [2]. Again, when the sizes of the target data for read and write commands are the same, it is assumed that the ratio of the processing amount required for a read command to the processing amount required for a write command is 1:5. In addition, it is assumed that there is no high or low priority between command types.

FIG. 10B illustrates an example of the command processing amount required for each host 2 when the situation illustrated in FIG. 10A is assumed. Specifically, an example is illustrated in which the write command <3-1> is fetched from the queue 221 of the host [1], and then the read command <1-1> is fetched from the queue 221 of the host [2]. Here, since it is assumed that the amount of data targeted by each command is the same, the ratio of the processing amount required for the write command <3-1> to the processing amount required for the read command <1-1> is 5:1. That is, the amount of processing required by the host [1] is larger than the amount of processing required by the host [2]. The width of the rectangle representing the write command <3-1>, which is indicated by the double-headed arrow e41, corresponds to the processing amount required for the write command <3-1>. The width of the rectangle representing the read command <1-1>, which is indicated by the double-headed arrow e42, corresponds to the processing amount required for the read command <1-1>.

The command fetch arbitration method used in the memory system 1 of the present embodiment is based on the remaining cost. When the remaining amount of processing for the host [2] is smaller than the remaining amount of processing for the host [1], as illustrated in FIG. 10C, the memory system 1 of the present embodiment then fetches the read command <1-2> from the queue 221 for the host [2]. The width of the rectangle representing the read command <1-2>, which is indicated by the double-headed arrow e43, corresponds to the processing amount required for the read command <1-2>. As a result, the memory system 1 of the present embodiment may reduce the variation in the amount of processing completed over time for each host 2 among the plurality of hosts 2.

Figure 11:
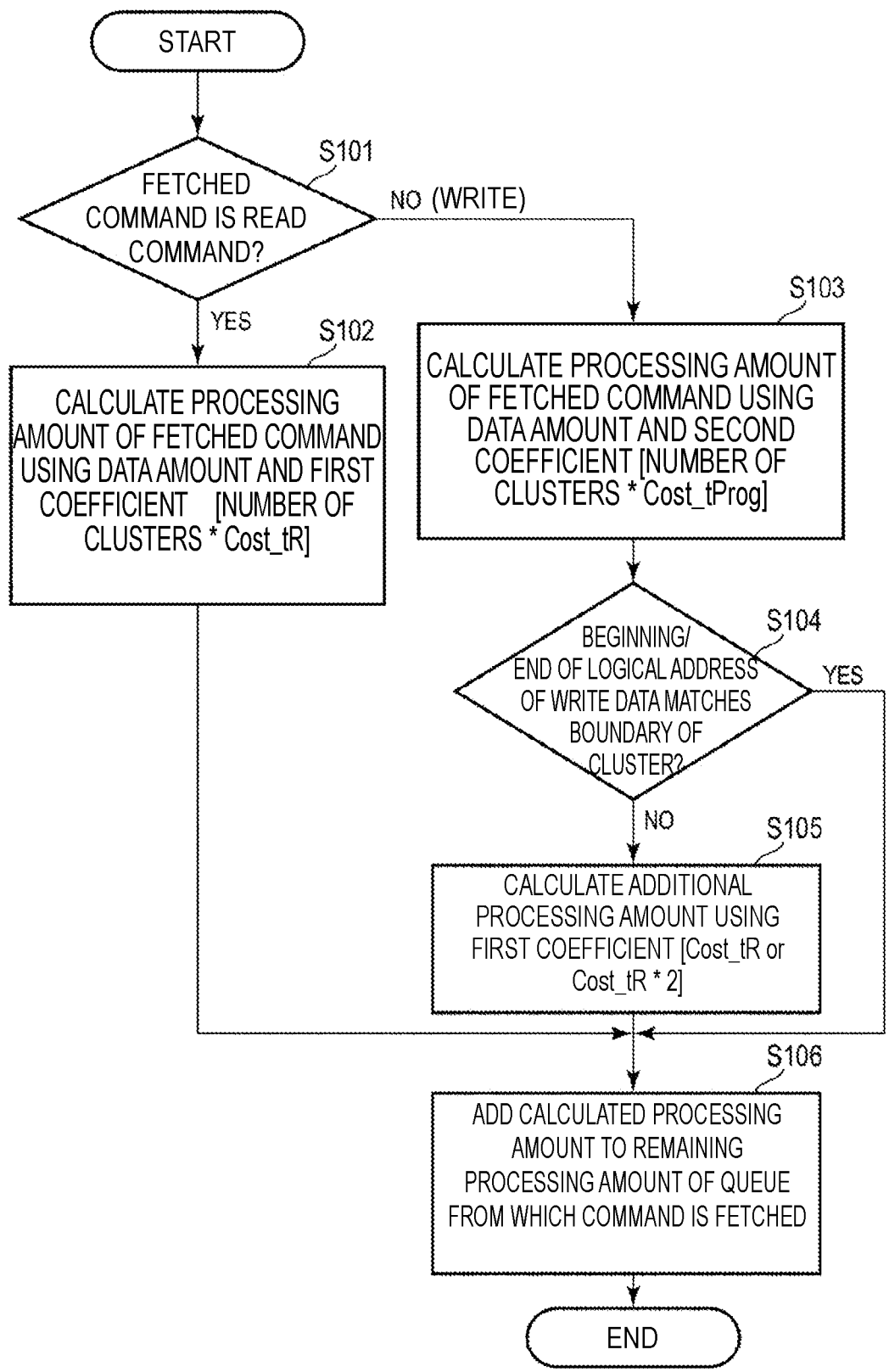
FIG. 11 is a flowchart illustrating a procedure for increasing a remaining processing amount as executed in the memory system of the embodiment.

FIG. 11 is a flowchart illustrating a procedure for increasing the remaining processing amount as executed by the command fetch arbitration unit 111 in order to manage the remaining cost for each queue 221.

When a command is fetched from a certain queue 221 of a certain host 2, the command fetch arbitration unit 111 determines whether the command is a read command or a write command (S101). When it is determined that the command is a read command ("YES" in S101), the command fetch arbitration unit 111 calculates the processing amount (cost) of the read command by using the data amount (e.g., the number of clusters) of the read data and the first coefficient (cost_tR) (S102). The command fetch arbitration unit 111 adds the calculated processing amount (cost) to the remaining processing amount (remaining cost) of the certain queue 221 from which the read command is fetched (S106).

Meanwhile, when it is determined that the fetched command is a write command ("NO" in S101), the command fetch arbitration unit 111 calculates the processing amount (cost) of the write command by using the data amount (e.g., the number of clusters) of the write data and the second coefficient (cost_tProg) (S103). Subsequently, the command fetch arbitration unit 111 determines whether the beginning or end of the logical address space for writing the target data corresponds to the boundary of a cluster (S104). When it is determined that either the beginning or end of the logical address space for writing the target data does not correspond to the boundary of a cluster ("NO" in S104), the command fetch arbitration unit 111 calculates an additional processing amount (cost) using the first coefficient (cost_tR) (S105).

When it is determined that the beginning of the logical address space for writing the target data corresponds to a boundary of a cluster and the end of the logical address space for writing the target data correspond to the boundary of a cluster ("YES" in S104), the command fetch arbitration unit 111 skips the calculation (S105) of the additional processing amount (cost). The command fetch arbitration unit 111 adds the processing amount (cost) calculated in this way to the remaining processing amount (remaining cost) of the certain queue 221 from which the write command is fetched (S106).

Figure 12:
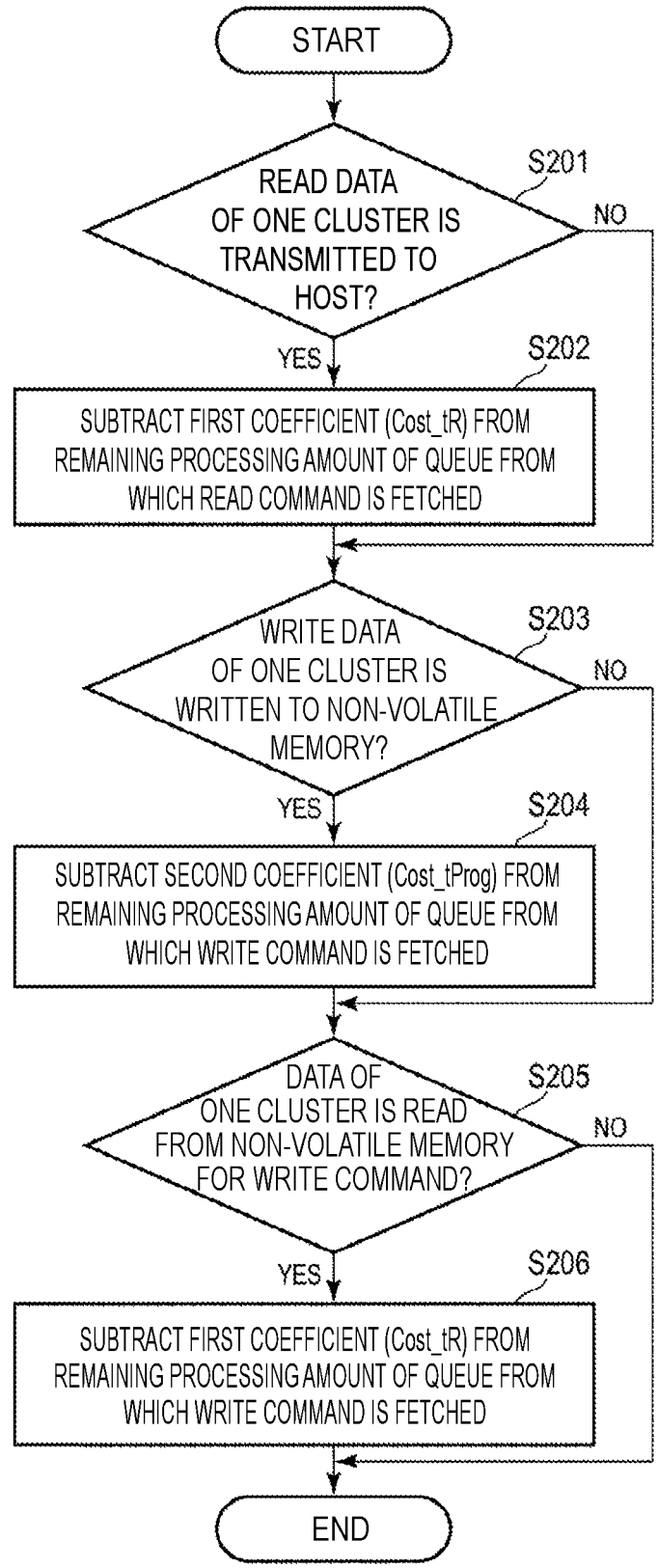
FIG. 12 is a flowchart illustrating a procedure for decreasing a remaining processing amount as executed in the memory system of the embodiment.

FIG. 12 is a flowchart illustrating a procedure for decreasing the remaining processing amount as executed by the command fetch arbitration unit 111 in order to manage the remaining cost for each queue 221.

When read data of one cluster is transmitted to the host 2 ("YES" in S201), the command fetch arbitration unit 111 subtracts the value for the first coefficient (cost_tR) from the remaining processing amount (remaining cost) of the queue from which the read command for the read data is fetched (S202).

When write data of one cluster is written to the non-volatile memory 12 ("YES" in S203), the command fetch arbitration unit 111 subtracts the value for the second coefficient (cost_tProg) from the remaining processing amount (remaining cost) of the queue from which the write command for the write data is fetched (S204).

In addition, when data of one cluster is read from the non-volatile memory 12 during the performance of the write command ("YES" in S205), the command fetch arbitration unit 111 subtracts the value for the first coefficient (cost_tR) from the remaining processing amount (remaining cost) of the queue from which the write command is fetched (S206). This subtraction corresponds to the addition of S105 in FIG. 11.

Figure 13:
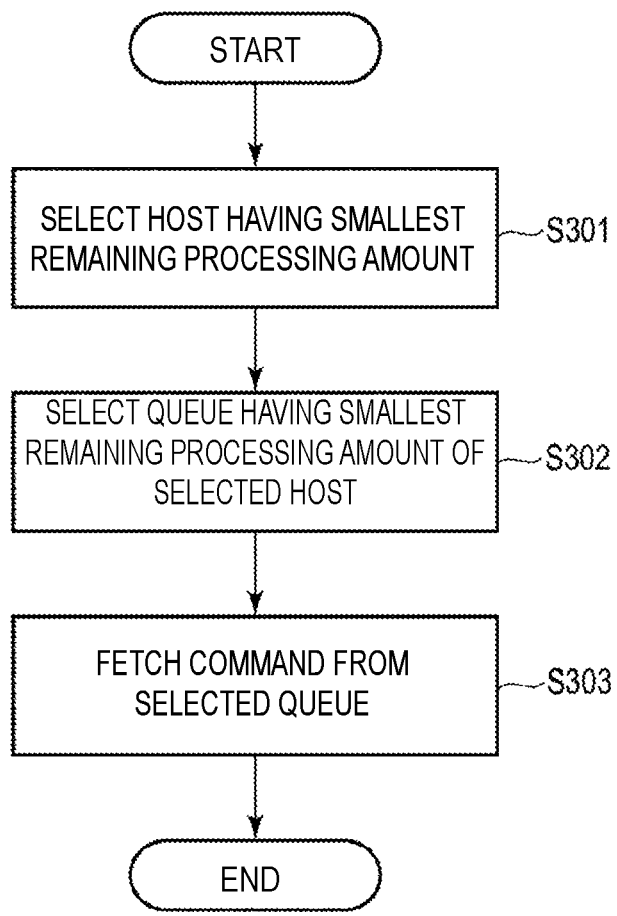

FIG. 13 is a flowchart illustrating a procedure in which the command fetch arbitration unit 111 selects a queue 221 for fetching commands therefrom.

The command fetch arbitration unit 111 first selects the host 2 having the smallest remaining processing amount (lowest remaining cost) (S301). The host 2 having the smallest remaining processing amount (lowest remaining cost) is a host 2 having the smallest total remaining processing amount (lowest remaining cost) stored in the remaining processing amount field c3 of the remaining processing table 111A.

Next, the command fetch arbitration unit 111 selects the queue 221 having the smallest remaining processing amount (lowest remaining cost) of the selected host 2 (S302). Then, the command fetch arbitration unit 111 fetches a command from the selected queue 221 (S303).

As described above, the memory system 1 of the present embodiment can reduce the variation in the amount of processing for commands completed over time among a plurality of hosts and among a plurality of queues at the time of command fetch.

In the above embodiment, the command fetch arbitration unit 111 increases and decreases the remaining cost of each queue 221 of each host 2, which is managed by using the remaining processing table 111A, as commands are fetched and processed. According to another embodiment, the command fetch arbitration unit 111 may perform only addition without subtraction. For example, the remaining processing amount field c3 may instead be treated as a cumulative processing amount. Each time a command is fetched from a queue 221, the cumulative processing amount may be increased. Then, queues 221 and hosts 2 may be selected for fetching commands based on, e.g., the smallest cumulative processing amount for commands fetched since the boot-up of the memory system 1.

Following the previous example in which cumulative processing amounts are used, if a new host 2 is introduced to the information processing system while the memory system 1 is operating, the average value of the cumulative costs corresponding to the queues 221 of the hosts 2 that have already been used in the information processing system may be set as the initial value of the cumulative costs of each queue 221 of the newly introduced host 2.

As an example of the remaining processing table 111A, FIG. 6 illustrates the remaining processing table 111A having the queue field c2. Instead of this, the command fetch arbitration unit 111 may manage the remaining cost of fetched commands for each host 2 without using the queue field c2 in the remaining processing table 111A. After selecting the host 2 having the lowest total remaining cost, the command fetch arbitration unit 111 may select the queue 221 in the host 2 by, for example, a round-robin method. In this case, the variation in the amount of processing completed over time for the commands among the plurality of hosts 2 can still be reduced.

Alternatively, when fetching a command from a certain host 2, the command fetch arbitration unit 111 may select the queue 221 having the lowest remaining cost in the host 2 by using the queue field c2 for that host 2, and when fetching a command from another host 2, select the queue 221 in the round-robin method without using the queue field c2 for that host 2.

Figure 14:
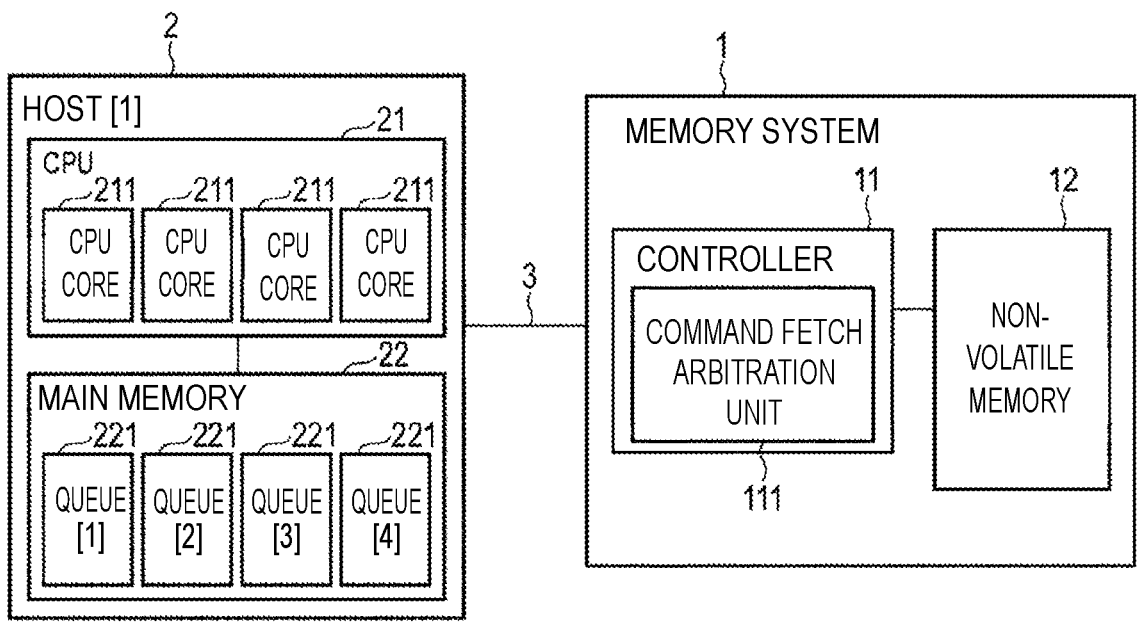
FIG. 14 is a diagram illustrating another configuration example of an information processing system including the memory system of the embodiment and a host connected to the memory system.

FIG. 1 illustrates an example in which the memory system 1 is connected to two hosts 2 (host [1] and host [2]). Alternatively, as illustrated in FIG. 14, even when only one host 2 is connected to the memory system 1, it is possible to reduce the variation in the amount of processing completed over time for commands among a plurality of queues 221. In this case, there is no step of selecting a host 2 having the lowest remaining cost.

When a plurality of hosts 2 is connected to the memory system 1, the command fetch arbitration unit 111 may also select the queue 221 having the lowest remaining cost among all the queues 221 without selecting the host 2 with the lowest total remaining cost.

Figure 15:
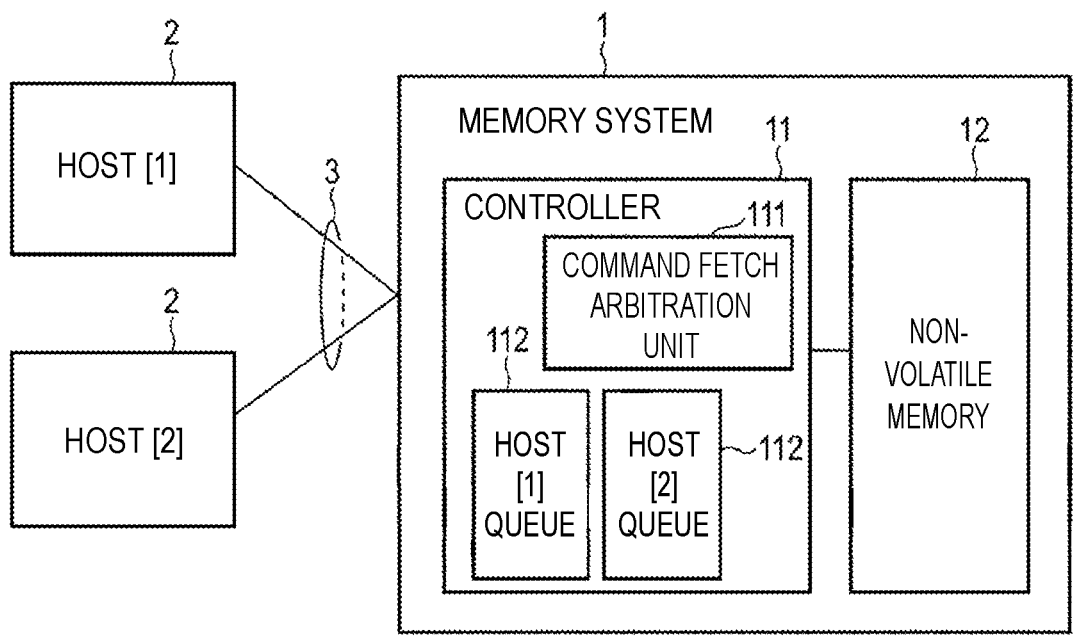
FIG. 15 is a diagram illustrating still another configuration example of an information processing system including the memory system of the embodiment and a host connected to the memory system.

FIG. 1 illustrates an example in which queues 221 are provided in each host 2. When the interface 3 conforms to the Serial Attached SCSI (SAS) protocol, for example, as illustrated in FIG. 15, a queue 112 for storing commands fetched from each host 2 may be provided for each host 2 in an internal memory (not illustrated) of the controller 11 of the memory system 1. The queues 112 are not limited to be provided in the internal memory of the controller 11, and may be provided in a memory (not illustrated) mounted on the memory system 1. The memory system 1 of the present embodiment can reduce the variation in the amount of processing completed over time for commands between the hosts 2 at the time of command fetch regardless of where the queues are stored.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A memory system comprising:
  a non-volatile memory; and
  a controller configured to control writing of data to the non-volatile memory or reading of data from the non-volatile memory, in response to a command from at least one host, wherein the controller is configured to perform command fetching by:
  calculating for each of a plurality of queues, a remaining processing amount, based on a type of one or more commands previously fetched therefrom and an amount of data targeted by the one or more commands, the remaining processing amount being an amount of processing remaining for the one or more commands previously fetched therefrom,
  selecting a queue that has the smallest remaining processing amount among the plurality of queues, and
  fetching a new command from the selected queue, wherein
  when the controller fetches a read command, the controller adds a value obtained by multiplying a first number by a first coefficient, to the remaining processing amount for a queue from which the read command is fetched, the first number being representative of a size of read data targeted by the read command, and
  when the controller fetches a write command, the controller adds a value obtained by multiplying a second number by a second coefficient that is larger than the first coefficient, to the remaining processing amount for a queue from which the write command is fetched, the second number being representative of a size of write data targeted by the write command.

2. The memory system according to claim 1, wherein
  when a logical address indicating a beginning of the write data does not correspond to a boundary of a first physical cluster, the controller adds a value corresponding to the first coefficient to the remaining processing amount for the queue from which the write command is fetched, and
  when a logical address indicating an end of the write data does not correspond to a boundary of a second physical cluster, the controller adds the value corresponding to the first coefficient to the remaining processing amount for the queue from which the write command is fetched.

3. The memory system according to claim 2, wherein
  each time at least a part of the read data is transmitted to the at least one host, the controller subtracts a value obtained by multiplying a third number by the first coefficient, from the remaining processing amount for the queue from which the read command is fetched, the third number being representative of a size of the part of the read data transmitted to the at least one host, and
  each time at least a part of the write data is written to the non-volatile memory, the controller subtracts a value obtained by multiplying a fourth number by the second coefficient, from the remaining processing amount for the queue from which the write command is fetched, the fourth number being representative of a size of the part of the write data written to the non-volatile memory.

4. The memory system according to claim 3, wherein
  when the logical address indicating the beginning of the write data does not correspond to the boundary of the first physical cluster or the logical address indicating the end of the write data does not correspond to the boundary of the second physical cluster, the controller executes reading of data from one physical cluster, and when the reading of the data from the one physical cluster is completed, subtracts the value corresponding to the first coefficient from the remaining processing amount for the queue from which the write command is fetched.

5. The memory system according to claim 1, wherein the plurality of queues is provided for at least two hosts, and the controller is further configured to select the host having a smallest remaining processing amount among the at least two hosts and select one of a plurality of queues of the selected host as the queue from which the new command is to be fetched.

6. The memory system according to claim 5, wherein the controller is configured to select the queue having the smallest remaining processing amount among the plurality of queues of the selected host as the queue from which the new command is to be fetched.

7. The memory system according to claim 1, wherein each of the plurality of queues is provided in a memory of the at least one host.

8. A method of fetching a command from one of a plurality of queues, the method comprising:
    calculating for each of the plurality of queues, a remaining processing amount, based on a type of one or more commands previously fetched therefrom and an amount of data targeted by the one or more commands, the remaining processing amount being an amount of processing remaining for the one or more commands previously fetched therefrom;
    selecting a queue that has the smallest remaining processing amount among the plurality of queues;
    fetching a new command from the selected queue;
    when a read command is fetched, adding a value obtained by multiplying a first number by a first coefficient, to the remaining processing amount for a queue from which the read command is fetched, the first number being representative of a size of read data targeted by the read command; and
    when a write command is fetched, adding a value obtained by multiplying a second number by a second coefficient that is larger than the first coefficient, to the remaining processing amount for a queue from which the write command is fetched, the second number being representative of a size of write data targeted by the write command.

9. The method according to claim 8, further comprising:
    when a logical address indicating a beginning of the write data does not correspond to a boundary of a first physical cluster, adding a value corresponding to the first coefficient to the remaining processing amount for the queue from which the write command is fetched; and
    when a logical address indicating an end of the write data does not correspond to a boundary of a second physical cluster, adding the value corresponding to the first coefficient to the remaining processing amount for the queue from which the write command is fetched.

10. The method according to claim 9, further comprising:
    each time at least a part of the read data is transmitted to a host, subtracting a value obtained by multiplying a third number by the first coefficient, from the remaining processing amount for the queue from which the read command is fetched, the third number being representative of a size of the part of the read data transmitted to the host; and
    each time at least a part of the write data is written to a non-volatile memory, subtracting a value obtained by multiplying a fourth number by the second coefficient, from the remaining processing amount for the queue from which the write command is fetched, the fourth number being representative of a size of the part of the write data written to the non-volatile memory.

11. The method according to claim 10, further comprising:
    when the logical address indicating the beginning of the write data does not correspond to the boundary of the first physical cluster or the logical address indicating the end of the write data does not correspond to the boundary of the second physical cluster, executing reading of data from one physical cluster; and
    when the reading of the data from the one physical cluster is completed, subtracting the value corresponding to the first coefficient from the remaining processing amount for the queue from which the write command is fetched.

12. The method according to claim 8, wherein the plurality of queues is provided for at least two hosts, said method further comprising:
    selecting a host having a smallest remaining processing amount among the at least two hosts, wherein one of a plurality of queues of the selected host is selected as the queue from which the new command is to be fetched.

13. The method according to claim 12, wherein the queue having the smallest remaining processing amount among the plurality of queues of the selected host is selected as the queue from which the new command is to be fetched.

14. The method according to claim 8, wherein each of the plurality of queues is provided in a memory of at least one host.

* * * * *